(12) United States Patent
Majalahti

(10) Patent No.: US 6,337,121 B1
(45) Date of Patent: Jan. 8, 2002

(54) SOUND-PROOFING AND HEAT INSULATION MAT WITH INBUILT HEAT TRANSFER FEATURE

(75) Inventor: Lasse Tapio Majalahti, Oulu (FI)

(73) Assignee: Interbak Ltd., Wilmington, DE (US)

( * ) Notice: Subject to any disclaimer, the term of this patent is extended or adjusted under 35 U.S.C. 154(b) by 0 days.

(21) Appl. No.: 09/459,880

(22) Filed: Dec. 14, 1999

(51) Int. Cl.[7] ................................. B32B 3/00
(52) U.S. Cl. .................. 428/172; 428/72; 428/162; 428/163; 428/167; 428/188
(58) Field of Search ............... 428/167, 172, 428/164, 72, 76, 161, 162, 163, 181, 188; 5/417; 181/284, 293; 165/56

(56) References Cited

U.S. PATENT DOCUMENTS 3,092,529 A * 6/1963 Pearson ........................ 154/44
3,615,149 A * 10/1971 Malone et al. .............. 138/151

FOREIGN PATENT DOCUMENTS

| JP | 06300285 | 4/1993 |
| JP | 07217919 | 2/1994 |
| JP | 11050649 | 8/1997 |

\* cited by examiner

*Primary Examiner*—Donald J. Loney
(74) *Attorney, Agent, or Firm*—Larson & Taylor PLC

(57) ABSTRACT

A sound-proofing and heat insulation mat construction comprising: a body sheet (6) made of insulation material, grooves (10) formed on the top of said insulation sheet, a thin aluminum foil (4) mounted on said insulation sheet (6) and moreover covering the grooves (10), further flexible heat transfer pipes (5) mounted in said grooves on the top of the insulation sheet, a thin metal sheet layer (2) covering said pipes and a plurality of parallel V-grooves (8) on the underside of said insulation sheet (6) and further an underliner (7) as a felt-type layer on the underside of the insulation sheet (6) and the underliner (7) folded into said V-grooves said folding allowing the mat element to be bent into bent-up position.

5 Claims, 1 Drawing Sheet

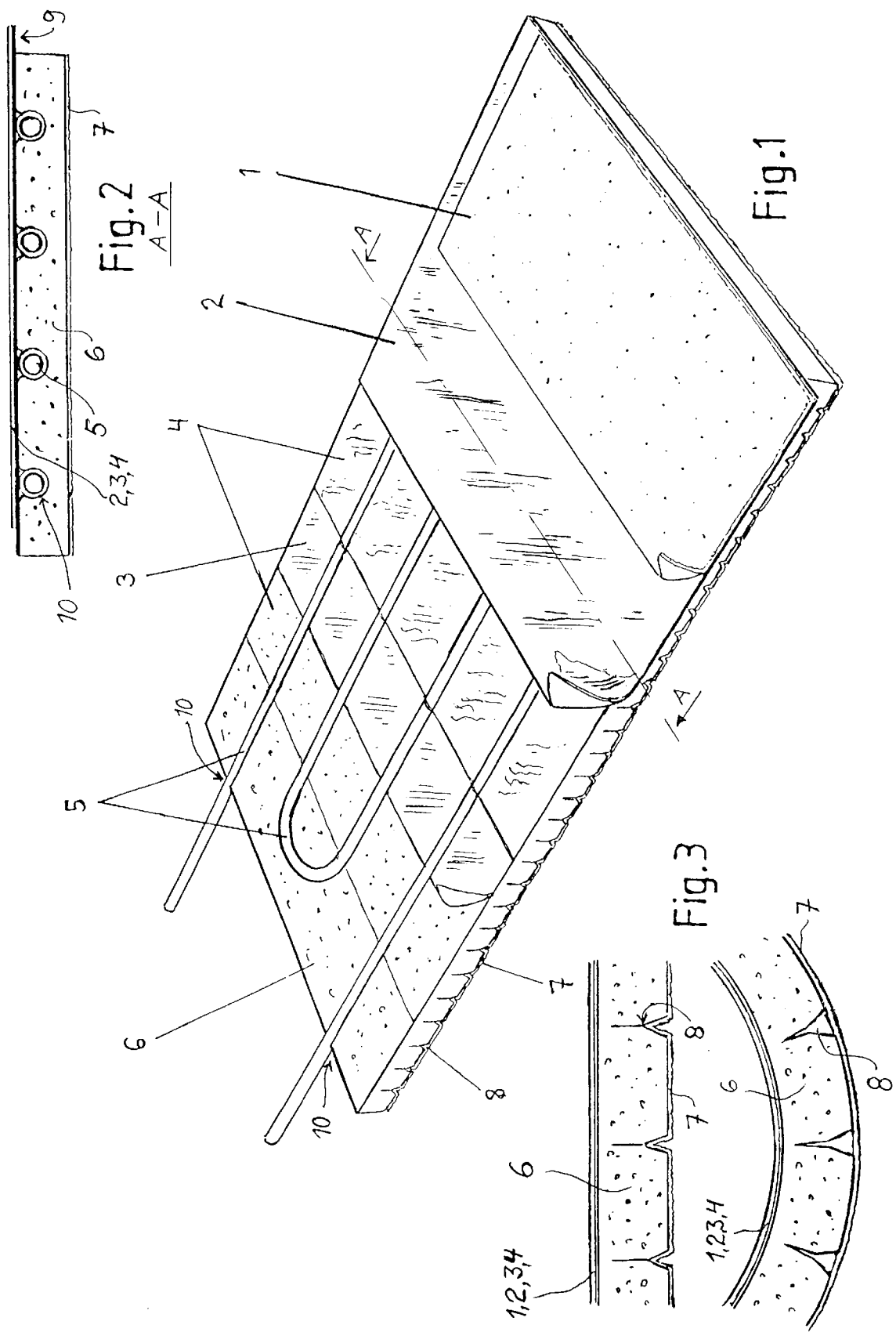

SOUND-PROOFING AND HEAT INSULATION MAT WITH INBUILT HEAT TRANSFER FEATURE

FIELD OF THE INVENTION

This invention relates to a mat construction for solving problems concerning sound-proofing and insulation requirements and wherever flat surface liquid-circulated heat transfer is needed.

BACKGROUND OF THE INVENTION

Previously are known floor heating panels, for example from abstracts of following Japanese Patent publications, No:s JP 07217919 A, JP 06300285 A and JP 11050649 A. The floor panels are foldable comprising a plurality of panel elements which can be folded on each other. The elements are equipped with hot water pipes as heating elements. The hot water pipes are flexible and bendable allowing folding of the elements.

The known floor panels are formed of inflexible elements. The hot water pipes are lead from one element to the other and the pipes are flexible between the elements wherein the elements can be folded forming a stack. Due to the inflexible elements and joints between them the above panels cannot be constructed into a continuous and homogenous mat.

SUMMARY OF THE INVENTION

The sound-proofing quality of this invention is readily displayed in its effective noise absorbtion. Through the integration of several hard and soft layers in its construction the invention effectively cuts out differing levels and frequencies of noises.

Wherever two or more story buldings are in question a plethora of different aural disturbancies can be heard from one story to the other. Especially the sharp step noises and moving of furniture and other loud sounds often carry annoyingly through the floor and ceiling to the next floor under.

In particular, floors inlayed with floating parquetly have a tendency to relay high step-noise levels, the problem that can be solved using this sound-proofing mat as an underlay. In addition, at the same time this invention can be utilized as a liquid-circulated heat transfer element for the entire floor area.

BRIEF DESCRIPTION OF THE DRAWINGS

In the following the invention is disclosed with reference to the enclosed drawing where FIG. 1 shows a mat construction where some layers are partly removed.

FIG. 2 shows a cross section of a mat.

FIG. 3 shows an edge of a mat seen from the side.

DETAILED DESCRIPTION OF THE PREFERRED EMBODIMENTS

FIG. 1 illustrates a mat according to the invention comprising a top layer 1 of thin, soft foam or felt-type material. The layer 2 under the top layer 1 is of hard yet flexible sheet or plate like sheet metal, thin plywood or similar. The next layer 3 downward is aluminum foil folded at pipe grooves formed in the following layer 6. The layer 4 is preferably flexible gum like glue layer mounted preferably on both sides of the aluminum foil 3. The layer 4 is, however, necessary at least on the underside of said foil.

Flexible pipes 5 are mounted in grooves 10 which locate on top of the layer 6. The layer 6 is made of urethane/polystyrene or similar insulation sheet underside partially cut and V-grooved 8 width-wise in sections, and upperside length-wise grooved 10 for pipes 5. The pipe 5 can be mounted loop-wise as presented in FIG. 1 or several parallel pipes can be mounted over the element without loops. The pipes 5 mounted in grooves 10 can be heating pipes or cooling pipes.

The underliner 7 of the mat is felt-type or similar underlining material glued in spots to urethane/polystyrene or other rigid insulation sheet. The layer 7 is folded into the V-grooves 8 of insulation to allow controlled bending of the sound-proofing mat element in surface layer direction.

FIG. 2 illustrates a cross section view of the mat covered with a steel sheet 2 or similar material or with plywood said sheet having overhang 9 portion for producing seamless joining of mat elements.

FIG. 3 illustrates a blow-up detail of the mat seen from the mat side. The lower figure showing the mat element in bent-up position. The underlining of felt-type fabric prevents the mat element from damaging overbending by drawing tight out of the V-grooves 8 which are formed parallel on the underside of the insulation sheet 6. The grooves 8 will open when the element is bent-up and close when it is returned as a plane sheet.

I claim:

1. A sound-proofing and heat insulation mat construction comprising:

a body sheet made of insulation material, grooves formed on a top of said insulation body sheet, a thin aluminum foil mounted on the top of said insulation body sheet and folded into said grooves, flexible heat transfer pipes mounted in said grooves on the top of the insulation body sheet, a flexible glue layer at least on an underside of said aluminum foil, a plurality of parallel V-grooves on an underside of said insulation body sheet, and an underliner layer on the underside of said insulation sheet which is folded into said V-grooves, said folding of said underliner layer allowing the mat to be bent into a bent-up position.

2. A mat construction according to claim 1 wherein the mat comprises a top layer of foam or felt material.

3. A mat construction according to claim 1 wherein said pipes and aluminum foil are covered by a thin metal sheet.

4. A mat construction according to claim 1 wherein the thin metal sheet layer comprises an overhang for joining.

5. A mat construction according to claim 1 wherein said pipes and aluminum foil are covered by a thin plywood.

* * * * *